US012621751B2

(12) United States Patent　　(10) Patent No.:　US 12,621,751 B2
Guan et al.　　　　　　　　　　(45) Date of Patent:　　　May 5, 2026

(54) WIRELESS COMMUNICATION METHOD, COMMUNICATION APPARATUS, AND COMMUNICATION SYSTEM

(71) Applicant: HUAWEI TECHNOLOGIES CO., LTD., Shenzhen (CN)

(72) Inventors: Lei Guan, Beijing (CN); Shengyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 18/458,641

(22) Filed: Aug. 30, 2023

(65) Prior Publication Data

US 2023/0413160 A1　　Dec. 21, 2023

Related U.S. Application Data

(63) Continuation of application No. PCT/CN2021/078785, filed on Mar. 2, 2021.

(51) Int. Cl.
　*H04W 48/08*　　(2009.01)
　*H04L 5/14*　　(2006.01)
　*H04W 16/28*　　(2009.01)
　*H04W 72/04*　　(2023.01)

(52) U.S. Cl.
　CPC ............... *H04W 48/08* (2013.01); *H04L 5/14* (2013.01); *H04W 16/28* (2013.01); *H04W 72/04* (2013.01)

(58) Field of Classification Search
None
See application file for complete search history.

(56) References Cited

U.S. PATENT DOCUMENTS

| 2020/0162182 | A1* | 5/2020 | Zhang | .................. | H04J 11/0076 |
| 2020/0196254 | A1* | 6/2020 | Kerhuel | .............. | H04W 56/001 |
| 2020/0260393 | A1* | 8/2020 | Zhang | ................ | H04W 56/001 |
| 2020/0413356 | A1* | 12/2020 | Wang | ............... | H04W 74/0808 |

FOREIGN PATENT DOCUMENTS

WO　　WO-2020147065 A1 *　7/2020　　............ H04W 48/16

OTHER PUBLICATIONS

Extended European Search Report issued in corresponding European Application No. 21928480.9, dated Mar. 11, 2024, pp. 1-12.

* cited by examiner

*Primary Examiner* — Hong S Cho
(74) *Attorney, Agent, or Firm* — HAUPTMAN HAM, LLP

(57)　　　　　　　ABSTRACT

Embodiments of this application provide a wireless communication method, a communication apparatus, and a communication system. In the method, a terminal determines, based on a detected SSB, a first index of the SSB in a first set and a second index of the SSB, and then determines a resource of the SSB. One SSB may correspond to one or more resources, and time division multiplexing may be performed between different resources. Therefore, there is a plurality of sending occasions for one SSB. Each SSB corresponds to one transmit beam direction, so that a sending occasion of an SSB corresponding to a transmit beam direction may be flexibly adjusted. When a plurality of SSBs in one set are sent, a sending sequence of SSBs corresponding to different transmit beam directions may be determined according to a service requirement, to further determine a resource occupied by each SSB.

20 Claims, 8 Drawing Sheets

WIRELESS COMMUNICATION METHOD, COMMUNICATION APPARATUS, AND COMMUNICATION SYSTEM

CROSS-REFERENCE TO RELATED APPLICATIONS

This application is a continuation of International Application No. PCT/CN2021/078785, filed on Mar. 2, 2021, the disclosure of which is hereby incorporated by reference in its entirety.

TECHNICAL FIELD

Embodiments of this application relate to the field of wireless communication technologies, and specifically, to a wireless communication method, a communication apparatus, and a communication system.

BACKGROUND

Compared with a 4th generation (4G) long term evolution (LTE) system, a 5th generation (5G) new radio (NR) system is more flexible in system design, including designs of a basic parameter, a frame structure, a time-frequency resource of a channel, and the like, and can better support forward compatibility and scalability. However, there is still a lack of flexibility in design of a common signal.

SUMMARY

Embodiments of this application provide a wireless communication method, a communication apparatus, and a communication system, to flexibly send common signals on different beams.

Embodiments of this application may be specifically implemented through the following technical solutions:

According to a first aspect, an embodiment of this application provides a wireless communication method. The method may be performed by a terminal or a component (for example, a chip or an apparatus) used in a terminal. The method includes: detecting a common signal; determining, based on a detected first common signal, a first index of the first common signal in a first set and a second index of the first common signal, where the first set includes a plurality of common signals, the plurality of common signals include the first common signal, the first common signal includes a synchronization signal, the first index corresponds to a plurality of resources, the second index indicates one of the plurality of resources, and the resource includes a time domain resource and/or a frequency domain resource; and determining a resource of the first common signal based on the first index and the second index or based on the second index.

Based on the foregoing solution, the terminal determines, based on the detected first common signal, the first index of the first common signal in the first set and the second index of the first common signal, and further determines the resource of the first common signal. In the method, one common signal may correspond to one or more resources, and time division multiplexing may be performed between different resources. Therefore, there is a plurality of sending occasions for one common signal. In addition, each common signal corresponds to one transmit beam direction, so that a sending occasion of a common signal corresponding to a transmit beam direction may be flexibly adjusted. When a plurality of common signals in one set are sent, a sending sequence of common signals corresponding to different transmit beam directions may be determined according to a service requirement, to further determine a resource occupied by each common signal. According to the method, a plurality of common signals in one set may be flexibly sent on different beams, so that a possibility that the common signals are detected by the terminal may be improved, and thus a waste of resources is reduced.

In a possible implementation method, the first index or the second index is determined according to a first grouping rule. The common signals in the first set are grouped into at least one group according to the first grouping rule. Each of the at least one group corresponds to one resource set. The resource set includes at least one of the plurality of resources corresponding to the first index. Resource sets corresponding to different groups may be the same or different.

In a possible implementation method, the first grouping rule corresponding to the first set is determined, based on a sequence of the synchronization signal, from a plurality of candidate grouping rules; or the first grouping rule corresponding to the first set is determined, based on a quantity of common signals in one group corresponding to the first set, from a plurality of candidate grouping rules; or the first grouping rule corresponding to the first set is determined, based on a time division duplexing configuration, from a plurality of candidate grouping rules.

In a possible implementation method, the first index is determined based on a sequence of the synchronization signal.

In a possible implementation method, the first index is determined based on a first channel corresponding to the first common signal. The first channel is a broadcast channel, a channel carrying system information, or a control channel. The control channel is used to schedule the channel carrying the system information.

In a possible implementation method, the first index is determined based on one or more pieces of the following information corresponding to the first channel: information indicating the first index, a scrambling code of the first channel, and a DMRS sequence of the first channel.

According to the foregoing method, the first index of the first common signal in the first set may be flexibly determined.

In a possible implementation method, the second index is determined based on a sequence of the synchronization signal.

In a possible implementation method, the second index is determined based on the first channel corresponding to the first common signal. The first channel is a broadcast channel, a channel carrying system information, or a control channel. The control channel is used to schedule the channel carrying the system information.

In a possible implementation method, the second index is determined based on one or more pieces of the following information corresponding to the first channel: information indicating the second index, a scrambling code of the first channel, and a DMRS sequence of the first channel.

According to the foregoing method, the second index of the first common signal may be flexibly determined.

In a possible implementation method, a resource of a common signal other than the first common signal in the first set is determined based on the resource of the first common signal and the first set.

In a possible implementation method, a resource of a second common signal is determined based on the first index or the second index; and the second common signal is received based on the resource of the second common signal. The second common signal includes a control channel or a channel carrying system information. The control channel is used to schedule the channel carrying the system information.

In a possible implementation method, RRM measurement is performed based on the first common signal, to obtain an RRM measurement result corresponding to the first common signal, where the RRM measurement result is identified by the first index; and the RRM measurement result corresponding to the first common signal is sent to a radio access network device.

According to a second aspect, an embodiment of this application provides a wireless communication method. The method may be performed by a radio access network device or a component (for example, a chip or an apparatus) used in a radio access network device. The method includes: obtaining a first set, where the first set includes a plurality of common signals, the plurality of common signals include a first common signal, the first common signal includes a synchronization signal, an index of the first common signal in the first set is a first index, the first index corresponds to a plurality of resources, a second index of the first common signal indicates one of the plurality of resources, and the resource includes a time domain resource and/or a frequency domain resource; and sending the common signals in the first set to a terminal.

In a possible implementation method, the first set corresponds to a first grouping rule. The first grouping rule is used to determine the first index or the second index. The common signals in the first set are grouped into at least one group according to the first grouping rule. Each of the at least one group corresponds to one resource set. The resource set includes at least one of the plurality of resources corresponding to the first index.

In a possible implementation method, a sequence of the synchronization signal corresponds to the first grouping rule; or a quantity of common signals in one group corresponding to the first set corresponds to the first grouping rule; or a time division duplexing configuration corresponds to the first grouping rule.

In a possible implementation method, a sequence of the synchronization signal corresponds to the first index of the first common signal in the first set.

In a possible implementation method, a first channel corresponding to the first common signal corresponds to the first index. The first channel is a broadcast channel, a channel carrying system information, or a control channel. The control channel is used to schedule the channel carrying the system information.

In a possible implementation method, one or more pieces of the following information corresponding to the first channel correspond to the first index: information indicating the first index, a scrambling code of the first channel, and a DMRS sequence of the first channel.

In a possible implementation method, a sequence of the synchronization signal corresponds to the second index.

In a possible implementation method, a first channel corresponding to the first common signal corresponds to the second index. The first channel is a broadcast channel, a channel carrying system information, or a control channel. The control channel is used to schedule the channel carrying the system information.

In a possible implementation method, one or more pieces of the following information corresponding to the first channel correspond to the second index: information indicating the second index, a scrambling code of the first channel, and a DMRS sequence of the first channel.

In a possible implementation method, the first index or the second index corresponds to a resource of a second common signal. The second common signal includes a control channel or a channel carrying system information. The control channel is used to schedule the channel carrying the system information.

In a possible implementation method, an RRM measurement result that is from the terminal and that corresponds to the first common signal is received. The RRM measurement result is identified by the first index.

According to a third aspect, an embodiment of this application provides a communication apparatus. The apparatus may be a terminal, or may be a chip used in a terminal. The apparatus has a function of implementing any implementation method according to the first aspect. The function may be implemented by hardware, or may be implemented by hardware executing corresponding software. The hardware or software includes one or more modules corresponding to the foregoing function.

According to a fourth aspect, an embodiment of this application provides a communication apparatus. The apparatus may be a radio access network device, or may be a chip used in a radio access network device. The apparatus has a function of implementing any implementation method according to the second aspect. The function may be implemented by hardware, or may be implemented by hardware executing corresponding software. The hardware or software includes one or more modules corresponding to the foregoing function.

According to a fifth aspect, an embodiment of this application provides a communication apparatus. The communication apparatus includes a processor and a memory. The memory is configured to store a computer instruction. When the apparatus operates, the processor executes the computer instruction stored in the memory. In this way, the apparatus performs any implementation method according to the first aspect or the second aspect.

According to a sixth aspect, an embodiment of this application provides a communication apparatus. The communication apparatus includes a unit or means configured to perform the steps of any implementation method according to the first aspect or the second aspect.

According to a seventh aspect, an embodiment of this application provides a communication apparatus. The communication apparatus includes a processor and an interface circuit. The processor is configured to: communicate with another apparatus through the interface circuit, and perform any implementation method according to the first aspect or the second aspect. There are one or more processors.

According to an eighth aspect, an embodiment of this application provides a communication apparatus. The communication apparatus includes a processor coupled to a memory. The processor is configured to call a program stored in the memory, to perform any implementation method according to the first aspect or the second aspect. The memory may be located inside or outside the apparatus. There may be one or more processors.

According to a ninth aspect, an embodiment of this application further provides a computer-readable storage medium. Instruction are stored in the computer-readable storage medium. When the instructions are run on a communication apparatus, any implementation method according to the first aspect or the second aspect is performed.

According to a tenth aspect, an embodiment of this application further provides a computer program product. The computer program product includes a computer program. When the computer program is run by a communication apparatus, any implementation method according to the first aspect or the second aspect is performed.

According to an eleventh aspect, an embodiment of this application further provides a chip system. The chip system includes a processor, configured to perform any implementation method according to the first aspect or the second aspect.

According to a twelfth aspect, an embodiment of this application further provides a communication system. The communication system includes a communication apparatus configured to perform any implementation method according to the first aspect and a communication apparatus configured to perform any implementation method according to the second aspect.

DESCRIPTION OF EMBODIMENTS

Figure 1:
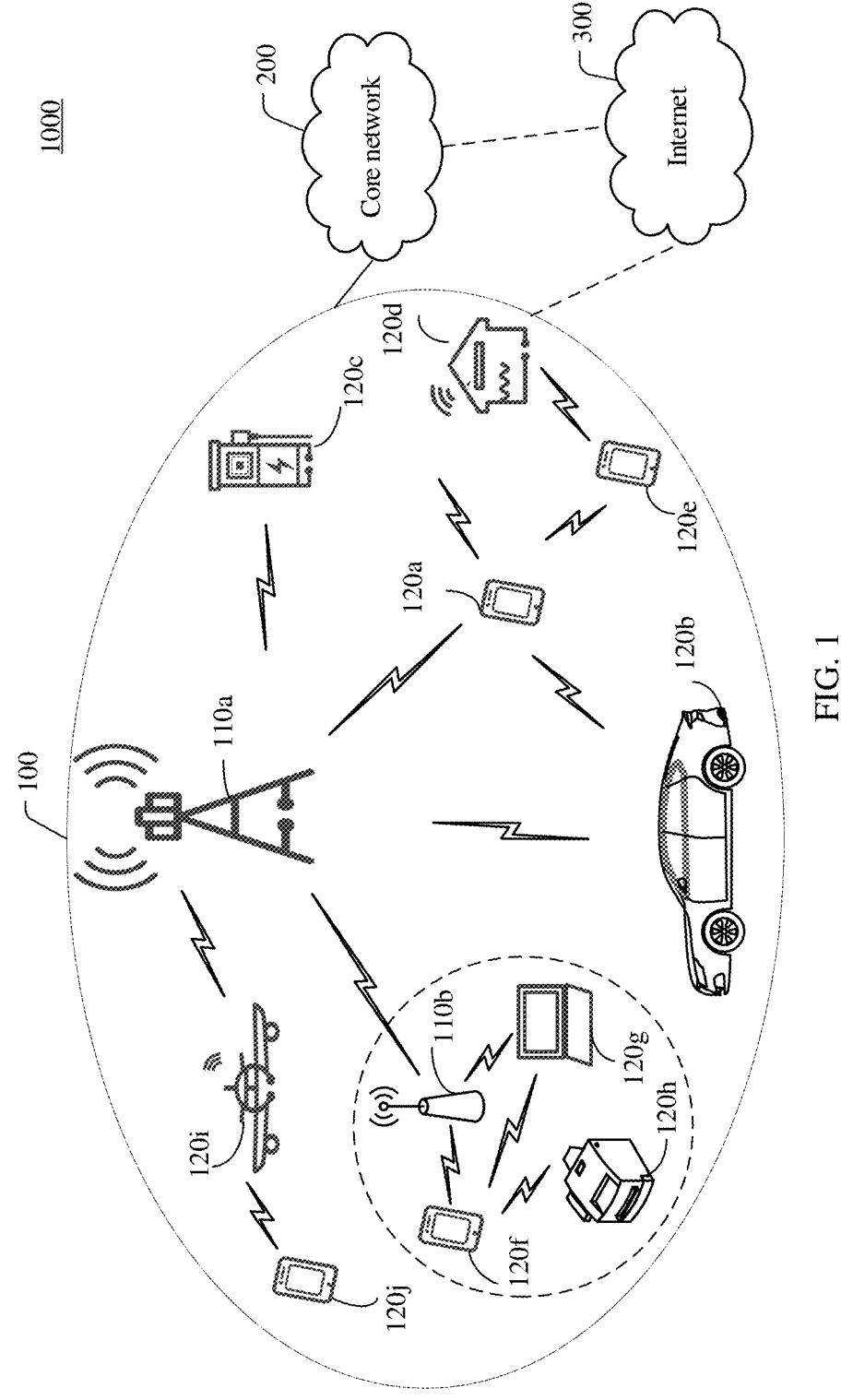
FIG. 1 is a schematic diagram of an architecture of a communication system used in an embodiment of this application.

FIG. 1 is a schematic diagram of an architecture of a communication system 1000 used in an embodiment of this application. As shown in FIG. 1, the communication system includes a radio access network 100 and a core network 200. Optionally, the communication system 1000 may further include the internet 300. The radio access network 100 may include at least one radio access network device (for example, 110a and 110b in FIG. 1), and may further include at least one terminal (for example, 120a to 120j in FIG. 1). The terminal is connected to the radio access network device in a wireless manner. The radio access network device is connected to the core network in a wireless or wired manner. A core network device and the radio access network device may be different independent physical devices, or functions of the core network device and logical functions of the radio access network device may be integrated into one physical device, or some functions of the core network device and some functions of the radio access network device may be integrated into one physical device. The terminals may be connected to each other in a wired or wireless manner. The radio access network devices may be connected to each other in a wired or wireless manner. FIG. 1 is merely a schematic diagram. The communication system may further include other network devices. For example, the communication system may further include a wireless relay device and a wireless backhaul device that are not drawn in FIG. 1.

The radio access network device may be a base station, an evolved NodeB (eNodeB), a transmission reception point (TRP), a next generation NodeB (gNB) in a 5G mobile communication system, a next generation NodeB in a 6th generation (6G) mobile communication system, a base station in a future mobile communication system, an access node in a wireless fidelity (Wi-Fi) system, or the like. Alternatively, the radio access network device may be a module or a unit that completes some functions of a base station, for example, a central unit (CU), or a distributed unit (DU). The radio access network device may be a macro base station (for example, 110a in FIG. 1), or may be a micro base station or an indoor site (for example, 110b in FIG. 1), or may be a relay node, a donor node, or the like. A specific technology and a specific device form used by the radio access network device are not limited in embodiments of this application. In this embodiment of this application, an example in which a base station is used as a radio access network device is used for description.

The terminal may also be referred to as a terminal device, user equipment (UE), a mobile station, a mobile terminal, or the like. The terminal may be widely used in various scenarios such as device-to-device (D2D), vehicle to everything (V2X) communication, machine-type communication (MTC), the internet of things (IOT), virtual reality, augmented reality, industrial control, self-driving, telemedicine, a smart grid, smart furniture, smart office, smart wear, smart transportation, and a smart city. The terminal may be a mobile phone, a tablet computer, a computer having wireless sending and receiving functions, a wearable device, a vehicle, an uncrewed aerial vehicle, a helicopter, an airplane, a ship, a robot, a robot arm, a smart home device, or the like. A specific technology and a specific device form used by the terminal are not limited in embodiments of this application.

The base station and the terminal may be located at a fixed position, or may be mobile. The base station and the terminal may be deployed on land, either indoors or outdoors in a handheld or vehicle-mounted manner, or may be deployed on the water, or may be deployed on an airplane, in a balloon, or on an artificial satellite in air. Application scenarios of the base station and the terminal are not limited in embodiments of this application.

Roles of the base station and the terminal may be relative. For example, the helicopter or the uncrewed aerial vehicle 120i in FIG. 1 may be configured as a mobile base station. For the terminal 120j that accesses the radio access network 100 through 120i, the terminal 120i is a base station. However, for the base station 110a, 120i is a terminal. In other words, communication between 110a and 120i is performed through a wireless air interface protocol. Certainly, communication between 110a and 120i may be alternatively performed through an interface protocol between base stations. In this case, 120i is also a base station relative to 110a. Therefore, both the base station and the terminal may be collectively referred to as communication apparatuses. 110a and 110b in FIG. 1 may be referred to as communication apparatuses having a base station function. 120a to 120j in FIG. 1 may be referred to as communication apparatuses having a terminal function.

Communication between a base station and a terminal, between base stations, and between terminals may be performed through a licensed spectrum, or may be performed through a license free spectrum, or may be performed through both a licensed spectrum and a license free spectrum. Communication may be performed through a spectrum of 6 gigahertz (GHz) or below, or may be performed through a spectrum of at least 6 GHz. Alternatively, communication may be performed through both a spectrum of 6 GHz or below and a spectrum of at least 6 GHz. A spectrum resource used by wireless communication is not limited in embodiments of this application.

In this embodiment of this application, a function of the base station may be performed by a module (for example, a chip) in the base station, or may be performed by a control subsystem having a base station function. The control subsystem having the base station function may be a control center in the foregoing application scenarios such as the smart grid, the industrial control, the intelligent transportation, and the smart city. A function of the terminal device may be alternatively performed by a module (for example, a chip or a modem) in the terminal, or may be performed by an apparatus having a terminal function.

In this application, the base station sends a downlink signal or downlink information to the terminal, and the downlink information is carried on a downlink channel. The terminal sends an uplink signal or uplink information to the base station, and the uplink information is carried on an uplink channel. To communicate with the base station, the terminal establishes a wireless connection to a cell controlled by the base station. A cell to which a wireless connection is established by the terminal is referred to as a serving cell of the terminal. When communicating with the serving cell, the terminal is further interfered by a signal from a neighboring cell.

In this embodiment of this application, a time domain symbol may be an orthogonal frequency division multiplexing (OFDM) symbol, or a discrete Fourier transform-spread-OFDM (DFT-s-OFDM) symbol. Unless otherwise specified, symbols in embodiments of this application are all time domain symbols.

It may be understood that, in embodiments of this application, a physical downlink shared channel (PDSCH), a physical downlink control channel (PDCCH), a physical uplink shared channel (PUSCH), and a physical broadcast channel (PBCH) are merely used as examples of a downlink data channel, a downlink control channel, an uplink data channel, and a broadcast channel. In different systems and different scenarios, a data channel, a control channel, and a broadcast channel may have different names. This is not limited in embodiments of this application.

In a 4G LTE system, designs of a basic system parameter, a frame structure, and a time-frequency resource of a signal are relatively fixed. Details are as follows:

First, in terms of a basic system parameter and a frame structure, the 4G LTE system only supports a fixed subcarrier spacing (SCS) of 15 kilohertz (kHz). One radio frame includes 10 subframes. Each subframe includes 14 OFDM symbols (briefly referred to as symbols below) for a normal cyclic prefix. A time domain scheduling granularity is one subframe. Only limited types of carrier bandwidths are supported, specifically including the following six types of bandwidths: 1.4 megahertz (MHz), 3 MHz, 5 MHz, 10 MHz, 15 MHz and 20 MHz. A frequency domain scheduling granularity is 12 subcarriers, namely, a bandwidth of one resource block (RB). The RB is a basic time-frequency scheduling unit, and specifically includes a time-frequency two-dimensional resource formed by one subframe in time domain and 12 subcarriers in a frequency. One subcarrier in one symbol is a minimum time-frequency resource, and is referred to as a resource element (RE), that is, one RB includes 12×14 REs.

Figure 2:
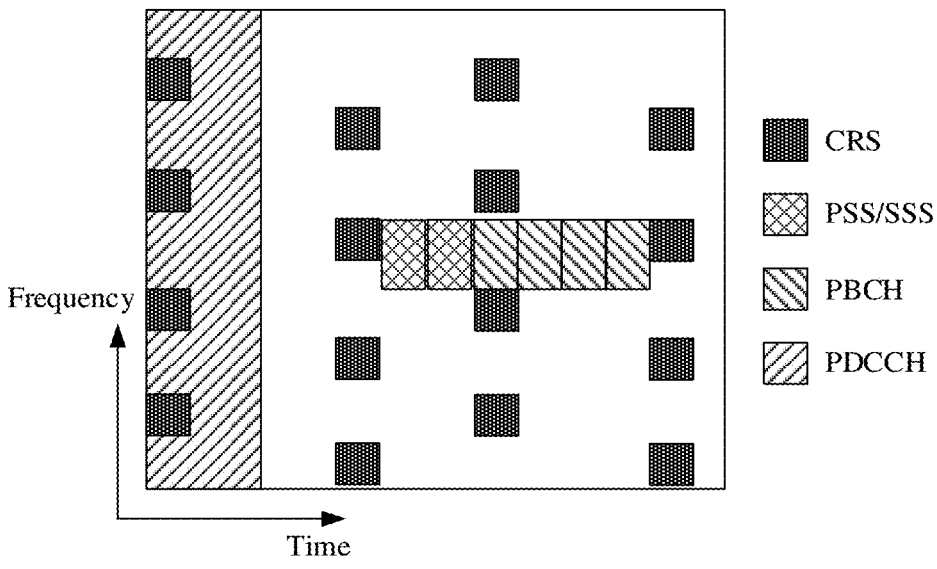
FIG. 2 is a schematic diagram of time-frequency resource positions of signals/channels in a 4G LTE system.

Second, in terms of a time-frequency resource of a signal, in a subframe, a signal for initial access is located in a bandwidth of six RBs in a center of a carrier, and includes a primary synchronization signal (PSS), a secondary synchronization signal (SSS), and a PBCH. Refer to FIG. 2. FIG. 2 is a schematic diagram of time-frequency resource positions of signals/channels in the 4G LTE system. The terminal can obtain a carrier bandwidth only after receiving a PBCH. Sending periodicities of the PSS and the SSS are five subframes, and a sending periodicity of the PBCH is 10 subframes. Regardless of whether there is data transmission, a cell-specific reference signal (CRS) is sent on each RB in each subframe for functions such as measurement, channel estimation, demodulation, and time-frequency tracking. A PDCCH is used to schedule uplink and downlink data channels and common information. To be specific, the PDCCH is scattered to an entire carrier bandwidth in a time-frequency interleaving manner. The time domain is located in first n symbols of a subframe, where n is one of the natural numbers 1-4. In this application, the common information may include a system information block (SIB), a random access channel (RACH) response, a paging message, and the like.

In a 5G NR system, designs of a basic system parameter, a frame structure, and a time-frequency resource of a signal are relatively flexible. Details are as follows:

First, in terms of a basic system parameter and a frame structure, the 5G NR system supports a plurality of SCSs. To be specific, for a frequency range 1 (generally considered 6 GHz or below), an SCS of 15/30/60 kHz is supported; and for a frequency range 2 (generally considered at least 6 GHz), an SCS of 60 kHz and an SCS of 120 kHz are supported. One radio frame includes 10 subframes, and duration of each subframe is 1 millisecond (ms). A time domain scheduling granularity of the NR system is defined as a slot. Each slot includes 14 OFDM symbols (briefly referred to as symbols below) for a normal cyclic prefix. Therefore, for different SCSs, one subframe includes different quantities of slots. For example, for an SCS of 15 kHz, one subframe includes one slot; and for an SCS of 30 kHz, one subframe includes two slots, and duration of each slot is 0.5 ms. In the NR communication system, a flexible carrier bandwidth is supported. To be specific, the carrier bandwidth is not limited to a limited quantity of carrier bandwidths in the LTE system. A basic scheduling granularity in frequency domain is also 12 subcarriers.

Second, in terms of a time-frequency resource of a signal, a signal for initial access in the NR system is referred to as a synchronization signal/physical broadcast channel block (SSB). The SSB includes a PSS, an SSS, and a PBCH. A frequency domain position of the SSB in a carrier is flexible. In other words, the SSB is not limited to being located at a center of the carrier as in the LTE system. A concept of a bandwidth part (BWP) is introduced to the NR system, to decouple a system-level carrier from a terminal-level BWP. For example, the NR system may support a carrier with a bandwidth of 100 MHz, but the terminal may only support a receiving capability of a BWP with a bandwidth of 20 MHz. In terms of a time domain periodicity, NR supports a plurality of SSB sending periodicities. In an initial access phase, it is assumed by the terminal that a sending periodicity of the SSB is 20 ms, namely, duration of two radio frames. To improve coverage, a beamforming mechanism is introduced to a common channel in the NR system, and omnidirectional coverage is implemented in a manner of performing beam sending on a plurality of SSBs. In addition, in the NR system, signal sending that always exists (for example, in the LTE system, regardless of whether there is data transmission, a CRS that always exists is sent on each RB in each subframe) is canceled to a large extent. Instead, a reference signal (RS) of a corresponding function is introduced in a function decoupling manner, for example, an SSS or a channel state information-reference signal (CSI-RS) for higher layer measurement, a CSI-RS for channel estimation, or a demodulation reference signal (DMRS) for demodulation. The RS of each function is configured and sent as directed. The PDCCH is still used to schedule uplink and downlink data channels and common information, but does not need to be scattered to an entire carrier bandwidth in a time-frequency interleaving manner. Instead, the PDCCH may be sent in frequency domain resources of some RBs in the carrier. The some RBs are referred to as a control resource set (CORESET). A detection position of the PDCCH in time domain is determined by a search space configuration, which is different from that in the LTE system. In the LTE system, the PDCCH is detected in each subframe.

In conclusion, compared with 4G LTE, the 5G NR communication system is more flexible in system design, including designs of the basic parameter, the frame structure, the time-frequency resource of the channel, and the like, and can better support forward compatibility and scalability.

In the NR system, an initial access process of the terminal mainly includes:

First, the PSS and the SSS are detected to achieve time-frequency synchronization with the NR system, and a physical cell identifier is obtained.

Then, a master information block (MIB) in the PBCH is received, and relevant system information of the NR system is obtained. The relevant system information includes an initial BWP and a time-frequency resource configuration (including resource configurations of a frequency domain CORESET and time domain search space) of a PDCCH for scheduling a common channel, and the like.

Then, an SIB 1 is received, and relevant system information other than the system information in the MIB is obtained. The relevant system information includes an RACH configuration, a time division duplexing (TDD) frame structure configuration, and the like.

Then, the terminal detects a system paging message, or the terminal sends random access to establish a radio resource control (RRC) connection with the base station.

After the RRC connection is successfully established, the terminal and the base station can perform normal data transmission.

Figure 3:
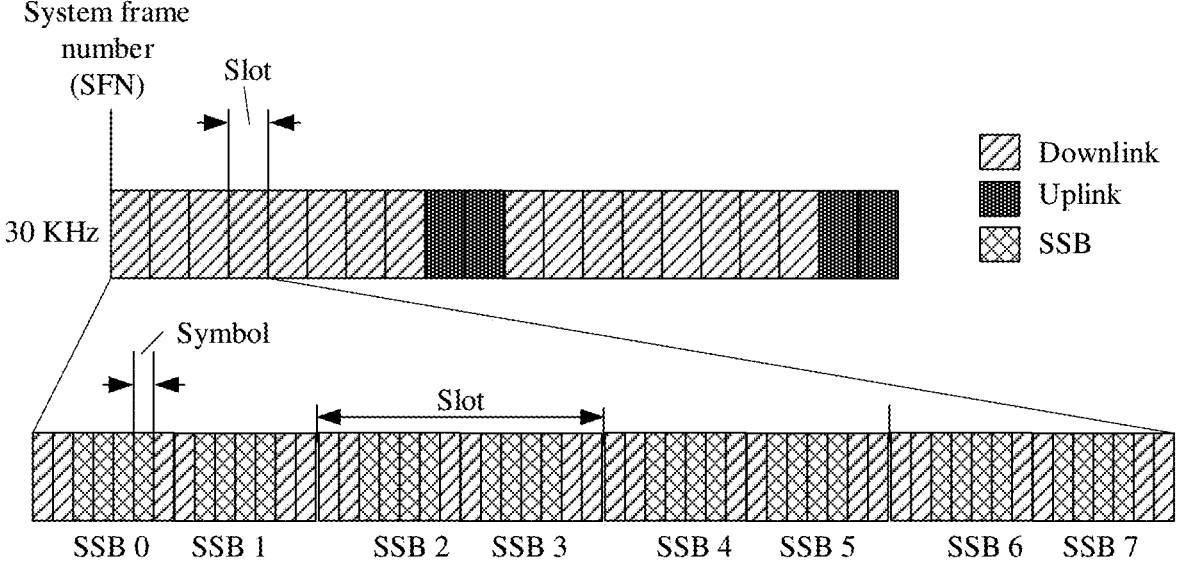
FIG. 3 is a schematic diagram of resource positions of SSBs in a 5G NR system.

To implement omnidirectional coverage of the common channel for initial access, a beamforming mechanism is used in NR. A plurality of SSBs are sent in a plurality of beam directions in a time division multiplexing (TDM) manner. The sending manner may be referred to as a common signal sending manner, or a common signal beam sweeping sending manner. The common signal herein includes the SSBs. For a plurality of to-be-sent SSBs, a TDM resource multiplexing manner is used for the plurality of SSBs. In addition, a resource position of each SSB is fixed. Refer to FIG. 3. FIG. 3 is a schematic diagram of resource positions of SSBs in the 5G NR system. In an SSB periodicity, sending of a set of SSB beams in a TDM manner is supported. The set of SSB beams is represented by SSB index numbers. For example, for an NR system deployed on a frequency band of 3 GHz to 6 GHz, the set of SSBs includes eight SSB beams with SSB indexes being #0, #1, . . . , and #7. A frequency domain position of each SSB is relatively flexible, and is on a predefined frequency grid. For a time domain position, the set of SSBs is located in a first half of a radio frame. The time domain position of each SSB is fixed. Refer to FIG. 3. An SCS of 30 kHz is used as an example. The eight SSBs are located in first four slots of the first half frame. Specific symbol positions are also fixed positions shown in FIG. 3. For the plurality of sent SSBs, transmit beam directions of the plurality of SSBs are different, and the plurality of SSBs are sent in a fixed sequence. The eight SSBs shown in FIG. 3 are used as an example. Beam directions of the SSB 0 to the SSB 7 are respectively a direction 1 to a direction 8. When the eight SSBs are sent, a sending sequence is as follows: The SSB 0 is sent in the direction 1, the SSB 1 is sent in the direction 2, the SSB 2 is sent in the direction 3, the SSB 3 is sent in the direction 4, the SSB 4 is sent in the direction 5, the SSB 5 is sent in the direction 6, the SSB 6 is sent in the direction 7, and the SSB 7 is sent in the direction 8. Therefore, the plurality of SSBs respectively occupy fixed resources. The base station sends beams of the plurality of SSBs on corresponding resources based on fixed directions.

Figure 4:
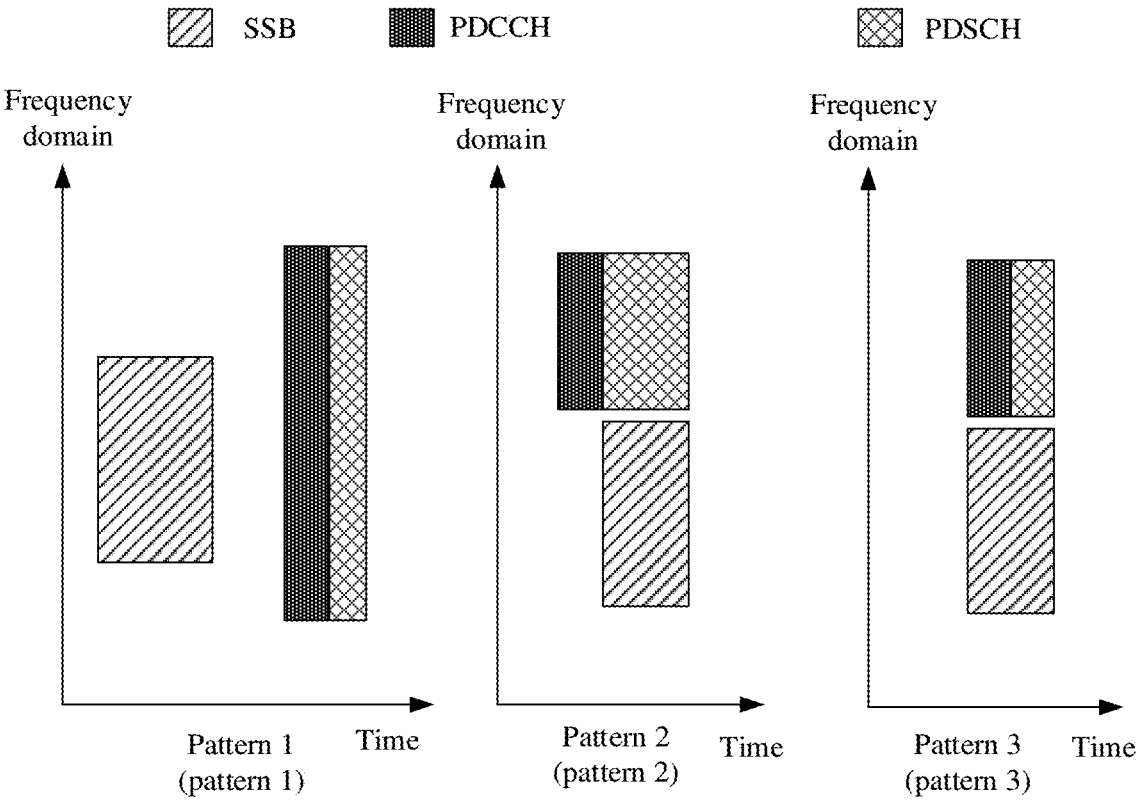
FIG. 4 is a schematic diagram of a resource multiplexing manner of an SSB and an initial common PDCCH in a 5G NR system.

In addition to the SSB using a beam sweeping sending manner, a common PDCCH used to schedule a common channel (for example, including an SIB 1, another SIB, a paging message, and the like) in an initial access phase is also sent in a similar beam sweeping sending manner. A time-frequency resource of the common PDCCH is jointly determined by a CORESET in frequency domain and search space in time domain. Refer to FIG. 4. FIG. 4 is a schematic diagram of a resource multiplexing manner of an SSB and an initial common PDCCH in the 5G NR system. The PDCCH is used to schedule a channel carrying an SIB. For a frequency range 1 (FR 1), NR only supports a multiplexing manner of TDM performed between the SSB and the PDCCH, namely, a pattern 1. For a frequency range 2 (FR 2), the NR system supports a multiplexing manner of TDM or frequency division multiplexing (FDM) performed between the SSB and the PDCCH. The FDM is further classified into a pattern 2 and a pattern 3. The FR 1 is 450 MHz to 6000 MHz, and the FR 2 is 24250 MHz to 52600 MHz.

Figure 5:
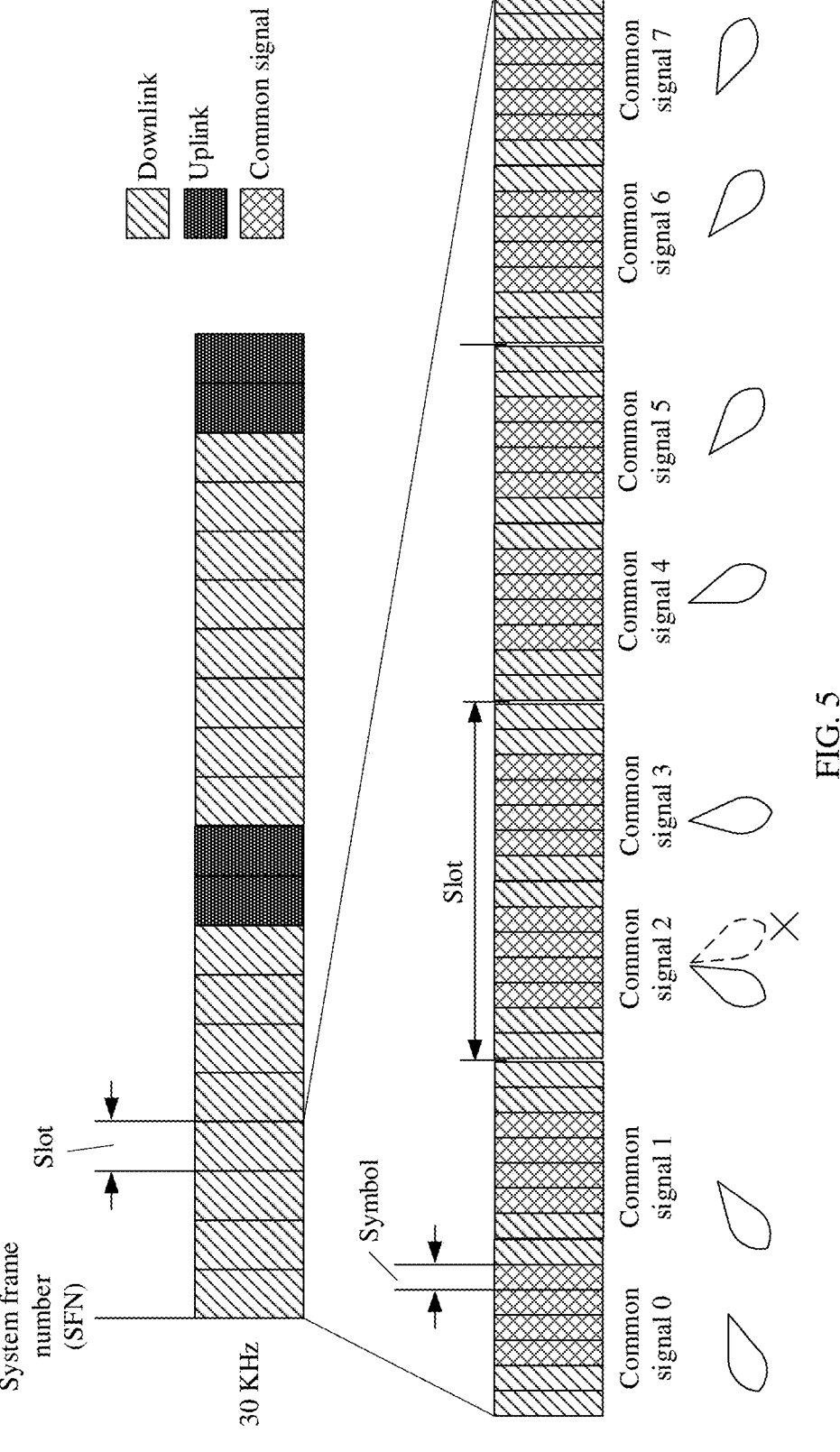
FIG. 5 is a schematic diagram in which dynamic scheduling in different beam directions cannot be performed on a common signal at a sending moment.

Based on the initial access mechanism described above of the NR system, it can be learned that there is a fixed correspondence between a current common signal sending manner and a frame structure. In addition, for the FR 2, due to a relatively high deployment frequency, more antenna elements are used to implement a greater beamforming gain. At present, an analog beam is used as a mainstream in the industry. For the analog beamforming mechanism, all frequency domain resources can use only a same beam weighting value at a same moment. As a result, a beam can point to only one direction. Refer to FIG. 5. FIG. 5 is a schematic diagram in which dynamic scheduling in beam direction cannot be performed on a common signal at a sending moment. In this example, beams of all sent common signals are swept and sent in different directions in a specific sequence. In addition, a sending direction of the beam of each common signal is fixed, and a time-frequency resource occupied by each common signal is also relatively fixed. A common signal 2 is used as an example. When a beam of the common signal 2 is sent, there may be no terminal or a relatively small quantity of terminals in a beam direction of the common signal 2, but there is a terminal or a relatively large quantity of terminals in another direction. However, only the common signal 2 can be sent at a current moment, and the beam direction of the common signal 2 is fixed. Therefore, the direction in which there is a terminal or a relatively large quantity of terminals cannot be pointed to.

As a result, on the one hand, a terminal having a communication requirement cannot be served, and on the other hand, the beam of the common signal is invalidly sent, to lead to a waste of resources.

Therefore, how to flexibly send a common signal is a problem to be resolved in this embodiment of this application.

To resolve this problem, in this embodiment of this application, a plurality of common signal sending manners are introduced. Each common signal sending manner corresponds to one common signal set. One common signal set includes a plurality of common signals. Each of the plurality of common signals corresponds to one transmit beam direction. Different common signals generally correspond to different transmit beam directions. One common signal sending manner indicates a sending sequence of a plurality of common signals in a common signal set. The base station may determine, according to a service requirement, a common signal sending manner corresponding to a common signal set, and send, based on the common signal sending manner, a plurality of common signals in the common signal set to the terminal. The terminal may detect one or more of the plurality of common signals, and obtain information such as a synchronization signal from the detected common signal. In this application, unless otherwise specified, a "set" may be an abbreviation of the "common signal set".

In an implementation method, in this embodiment of this application, a plurality of common signals in one common signal set may be grouped according to different candidate grouping rules, to obtain one or more groups. Each group corresponds to one resource set. Each resource set includes one or more of resources corresponding to the plurality of common signals. Each resource includes a time domain resource and/or a frequency domain resource. Common signals in a same group share a resource in a same resource set. In other words, a common signal in a group may use any resource in a resource set corresponding to the group, but one resource can be allocated to only one common signal at a moment.

Figure 6:
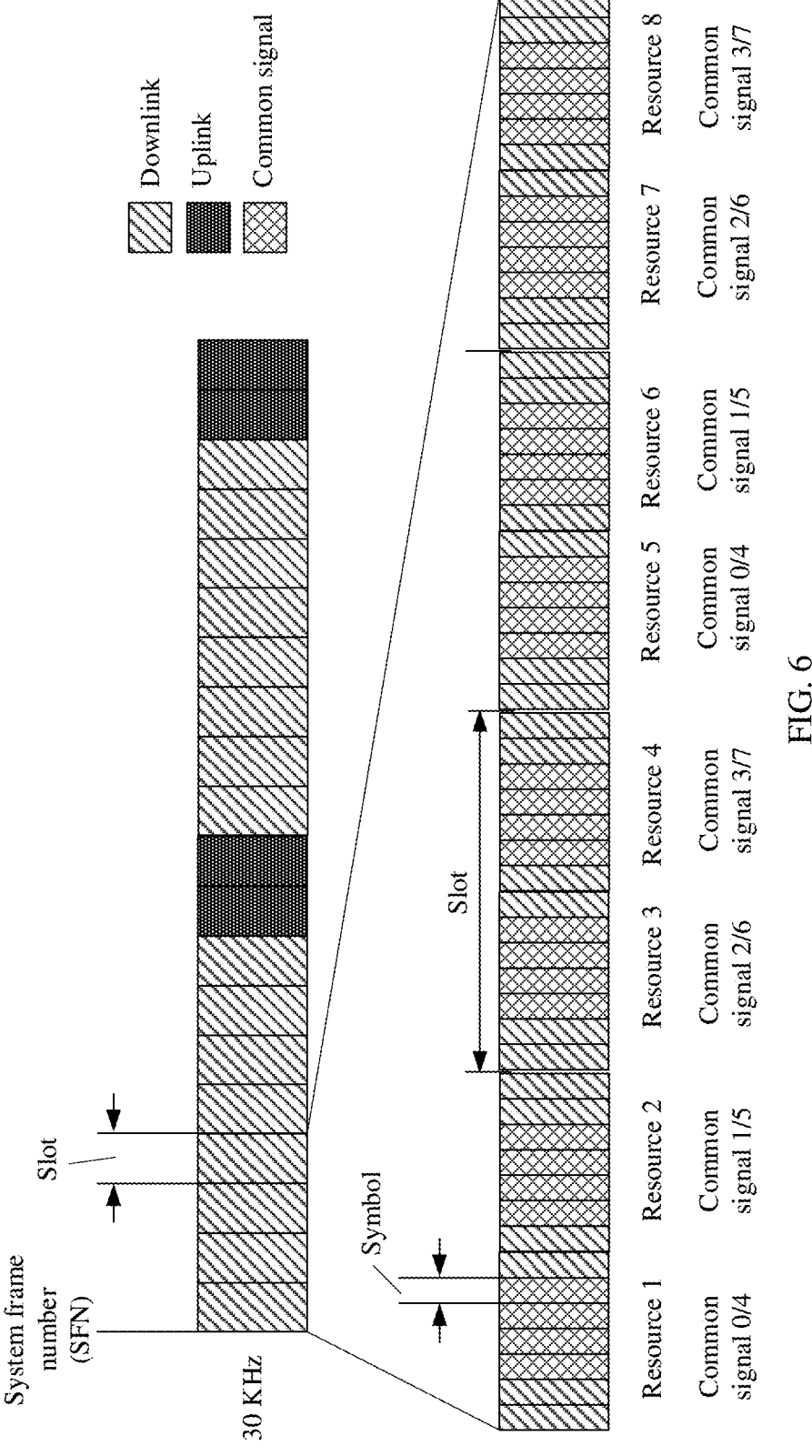
FIG. 6 is a schematic diagram of a grouping rule.

FIG. 6 is a schematic diagram of a grouping rule. According to the grouping rule, common signals in a first set are divided into four groups. The first set includes a common signal 0 to a common signal 7. Details are as follows:

The group 1 includes the common signal 0 and a common signal 4, and corresponds to a resource set 1 including a resource 1 and a resource 5. During one sending, the common signal 0 corresponds to one of the resource 1 and the resource 5, and the common signal 4 corresponds to the other of the resource 1 and the resource 5.

The group 2 includes a common signal 1 and a common signal 5, and corresponds to a resource set 2 including a resource 2 and a resource 6. During one sending, the common signal 1 corresponds to one of the resource 2 and the resource 6, and the common signal 5 corresponds to the other of the resource 2 and the resource 6.

The group 3 includes a common signal 2 and a common signal 6, and corresponds to a resource set 3 including a resource 3 and a resource 7. During one sending, the common signal 2 corresponds to one of the resource 3 and the resource 7, and the common signal 6 corresponds to the other of the resource 3 and the resource 7.

The group 4 includes a common signal 3 and the common signal 7, and corresponds to a resource set 4 including a resource 4 and a resource 8. During one sending, the common signal 3 corresponds to one of the resource 4 and the resource 8, and the common signal 7 corresponds to the other of the resource 4 and the resource 8.

According to the foregoing grouping rule, a plurality of common signal sending manners corresponding to the first set may be obtained. A common signal sending sequence corresponding to any one of the plurality of common signal sending manners may be expressed as follows: one of the common signal 0 and the common signal 4, one of the common signal 1 and the common signal 5, one of the common signal 2 and the common signal 6, one of the common signal 3 and the common signal 7, the other of the common signal 0 and the common signal 4, the other of the common signal 1 and the common signal 5, the other of the common signal 2 and the common signal 6, and the other of the common signal 3 and the common signal 7. Each common signal corresponds to one transmit beam direction. For example, the common signal 0 to the common signal 7 respectively correspond to a direction 1 to a direction 8.

For example, the common signal sending manners corresponding to the first set include a common signal sending manner 1, a common signal sending manner 2, and a common signal sending manner 3.

A common signal sending sequence corresponding to the common signal sending manner 1 is as follows: the common signal 0, the common signal 1, the common signal 2, the common signal 3, the common signal 4, the common signal 5, the common signal 6, and the common signal 7. In addition, the resource 1 is allocated to the common signal 0, the resource 2 is allocated to the common signal 1, the resource 3 is allocated to the common signal 2, the resource 4 is allocated to the common signal 3, the resource 5 is allocated to the common signal 4, the resource 6 is allocated to the common signal 5, the resource 7 is allocated to the common signal 6, and the resource 8 is allocated to the common signal 7.

A common signal sending sequence corresponding to the common signal sending manner 2 is as follows: the common signal 0, the common signal 5, the common signal 2, the common signal 3, the common signal 4, the common signal 1, the common signal 6, and the common signal 7. In addition, the resource 1 is allocated to the common signal 0, the resource 2 is allocated to the common signal 5, the resource 3 is allocated to the common signal 2, the resource 4 is allocated to the common signal 3, the resource 5 is allocated to the common signal 4, the resource 6 is allocated to the common signal 1, the resource 7 is allocated to the common signal 6, and the resource 8 is allocated to the common signal 7.

A common signal sending sequence corresponding to the common signal sending manner 3 is as follows: the common signal 4, the common signal 5, the common signal 6, the common signal 3, the common signal 0, the common signal 1, the common signal 2, and the common signal 7. In addition, the resource 1 is allocated to the common signal 4, the resource 2 is allocated to the common signal 5, the resource 3 is allocated to the common signal 6, the resource 4 is allocated to the common signal 3, the resource 5 is allocated to the common signal 0, the resource 6 is allocated to the common signal 1, the resource 7 is allocated to the common signal 2, and the resource 8 is allocated to the common signal 7.

When sending a plurality of common signals in one set to the terminal, the base station may flexibly select sending time of each common signal according to a service requirement and a grouping rule. Each common signal corresponds to one transmit beam direction, and different common signals generally correspond to different transmit beam directions. Therefore, a common signal corresponding to a transmit beam direction may be selected to be sent at a sending moment according to a service requirement. This helps improve a probability that the common signal is detected by the terminal, improve system performance, and reduce a waste of resources. The service requirement herein may indicate a specific position at which a terminal has a transmission requirement and a quantity of terminals having a transmission requirement at a sending moment of the common signal. The base station may select a common signal pointing to a terminal that has a transmission requirement for sending.

Figure 7:
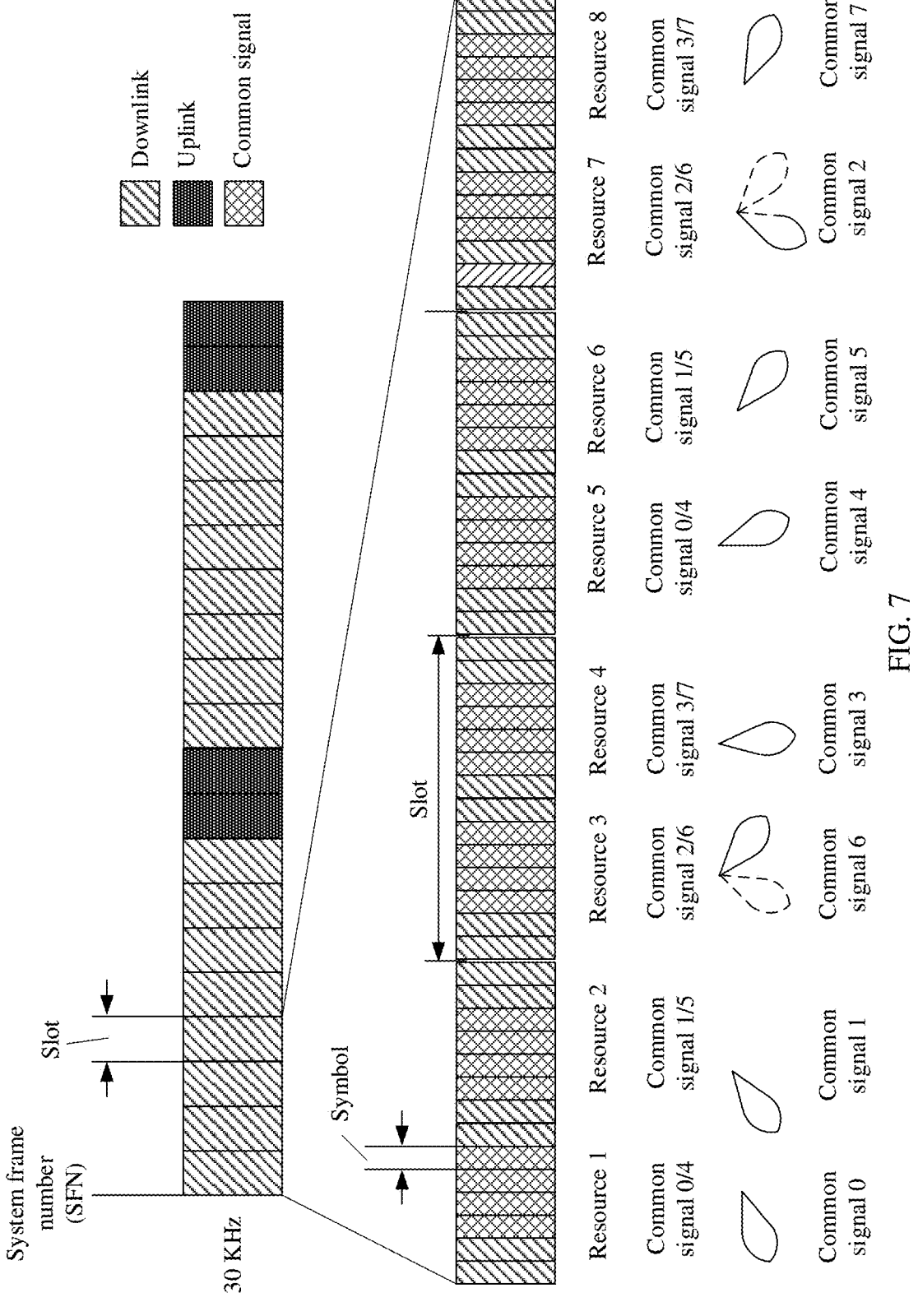
FIG. 7 is a schematic diagram of beam sending of a common signal.

FIG. 7 is a schematic diagram of flexible beam sending of a common signal. In this example, a first set includes a common signal 0 to a common signal 7, and a grouping rule is the same as the grouping rule in the example shown in FIG. 6. The base station sends the common signal 0 to the common signal 7 in the first set to the terminal according to the grouping rule. In addition, a common signal sending sequence corresponding to a common signal sending manner is as follows: the common signal 0, a common signal 1, a common signal 6, a common signal 3, a common signal 4, a common signal 5, a common signal 2, and the common signal 7. It can be learned that, at the first moment at which the common signal 2 or the common signal 6 may be sent in FIG. 7 (briefly referred to as a moment A), the base station chooses to send the common signal 6. At the second moment at which the common signal 2 or the common signal 6 may be sent (briefly referred to as a moment B), the base station chooses to send the common signal 2. This is because: The base station determines, at the moment A, that there is a relatively large quantity of terminals in a direction to which a beam of the common signal 6 points. Therefore, the base station determines to send the common signal 6, and sends the common signal 2 at the moment B. Therefore, the base station may flexibly select, based on a service requirement, a common signal from a corresponding group at a sending moment for sending, to flexibly send a plurality of common signals on different beams, thereby improving a probability that the common signal is detected by the terminal, and improving communication efficiency.

In this embodiment of this application, the base station sends the plurality of common signals in the first set to the terminal. The common signal detected by the terminal in the plurality of common signals is referred to as a first common signal. A second common signal is a common signal associated with the first common signal. An implementation method for the first common signal and the second common signal in this embodiment of this application includes but is not limited to the following implementation methods:

In an implementation method 1, the first common signal includes a synchronization signal and a broadcast channel, and the second common signal includes a control channel or a channel carrying system information.

Optionally, the synchronization signal includes a PSS and an SSS. The broadcast channel may be a PBCH, and is used to carry an MIB. The control channel may be a PDCCH, and is used to schedule the channel carrying the system information. The system information may include an SIB. The SIB herein may include an SIB 1.

In an implementation method 2, the first common signal includes a synchronization signal, and the second common signal includes a control channel or a channel carrying system information.

Optionally, the synchronization signal includes a PSS and an SSS. The control channel may be a PDCCH, and is used to schedule the channel carrying the system information. The system information herein may be minimum relevant system information. The minimum relevant system information includes an MIB and an SIB. The SIB herein may include an SIB 1. It should be noted that a name of the MIB or the SIB herein may be another name in future technology evolution.

The communication method provided in embodiments of this application may be performed by a terminal or a component (such as a chip or an apparatus) used in the terminal, and a base station or a component (such as a chip or an apparatus) used in the base station. For ease of description, in the following description, an example in which the method is performed by a terminal and a base station is used for description.

Figure 8:
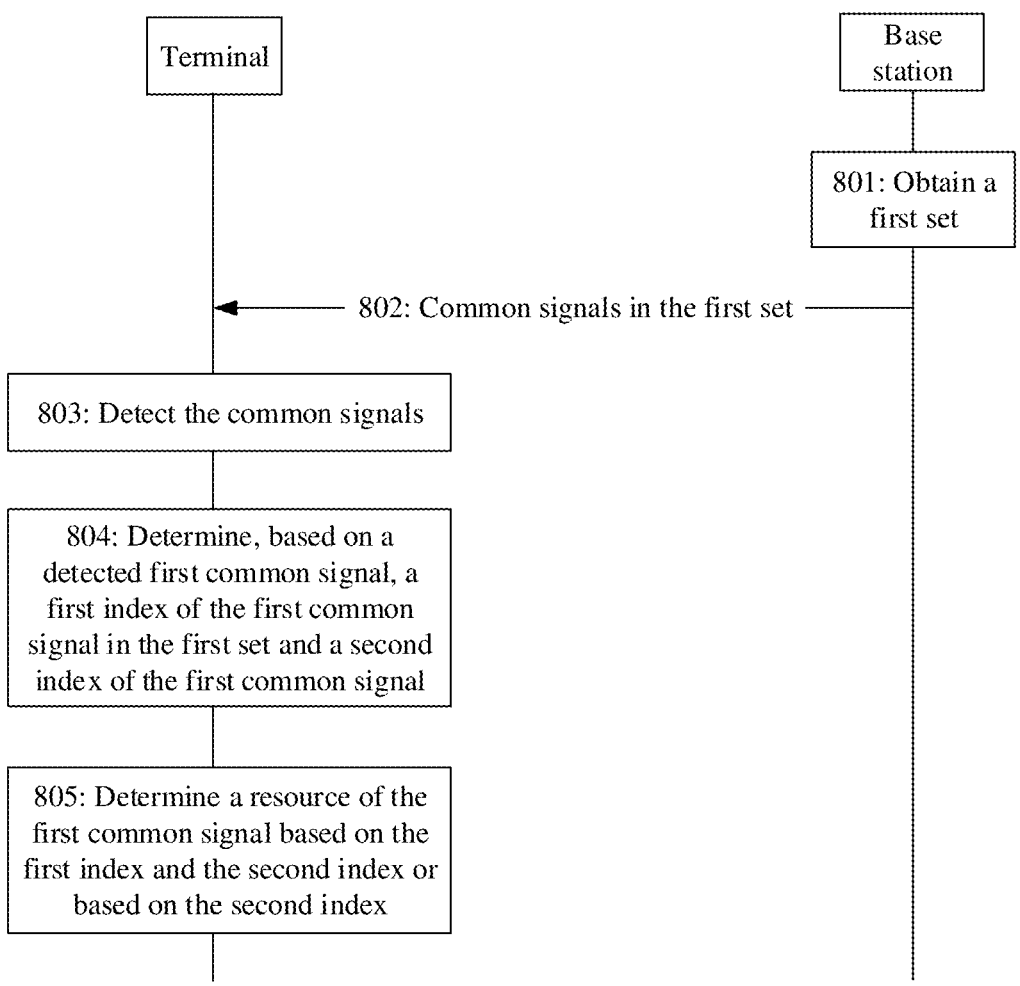
FIG. 8 is a schematic diagram of a wireless communication method according to an embodiment of this application.

FIG. 8 is a schematic diagram of a wireless communication method according to an embodiment of this application. The method includes the following operations:

801: A base station obtains a first set.

The first set includes a plurality of common signals. The plurality of common signals include a first common signal. The first common signal includes a synchronization signal. An index of the first common signal in the first set is a first index. The first index corresponds to a plurality of resources. A second index of the first common signal indicates one of the plurality of resources. The resource includes a time domain resource and/or a frequency domain resource. The first set may be predefined, for example, predefined by a protocol.

The first set may be grouped according to a first grouping rule. The first grouping rule may be one of a plurality of candidate groups. Alternatively, the first grouping rule may be predefined, that is, there is only one grouping rule. Alternatively, there may be no grouping rule. In this case, all common signals in the first set may be considered as one group. The common signals in the first set are divided into at least one group according to the first grouping rule. Each of the at least one group corresponds to one resource set. The resource set includes at least one of a plurality of resources corresponding to the first set. For example, FIG. 6 may be an example of the first grouping rule.

802: The base station sends the common signals in the first set to a terminal.

When sending the common signals in the first set to the terminal, the base station may flexibly select, according to a service requirement and a grouping rule, a common signal from a group corresponding to a sending moment for sending. One group may correspond to a plurality of sending moments. Any common signal in the group may be sent at any one of the plurality of sending moments. Each common signal corresponds to one transmit beam direction. Therefore, a common signal corresponding to a transmit beam direction may be selected to be sent at a sending moment according to a service requirement. This helps improve a probability that the common signal is detected by the terminal, improve system performance, and reduce a waste of resources. FIG. 7 is an example in which the base station sends the common signals in the first set to the terminal.

803: The terminal detects the common signals.

For example, the terminal detects the common signal sent by the base station, and may detect the sent first common signal in the first set.

In an implementation method, the terminal may detect the synchronization signal based on a candidate sequence of the synchronization signal and a corresponding SCS. The candidate sequence may be predefined by a standard. For example, a unified candidate sequence for a PSS and an SSS is used. Alternatively, a set of candidate sequences may be predefined for each frequency band. Candidate sequences corresponding to different frequency bands may be the same or different. For example, a first set of candidate sequences is used in a frequency band 1, and a second set of candidate sequences is used in a frequency band 2.

An SCS of the synchronization signal may be associated with a frequency band. For example, SCSs of 15 kHz and 30 kHz are used in the frequency band 1, and SCSs of 120 kHz and 240 kHz are used in the frequency band 2. For another example, one SCS or one SCS set may be used in all frequency bands.

By detecting a candidate SCS and a candidate sequence, the terminal may detect a synchronization signal. For example, a synchronization signal with an SCS of 30 kHz is detected in the frequency band 1.

After detecting the synchronization signal, the terminal may receive a broadcast channel. An SCS of the broadcast channel may be the same as or have an association relationship with the SCS of the synchronization signal. A time-frequency resource of the broadcast channel may also have an association relationship with a time-frequency resource of the synchronization signal, for example, on a same or neighboring symbol, or on a same or neighboring RB.

804: The terminal determines, based on the detected first common signal, the first index of the first common signal in the first set and the second index of the first common signal.

In an implementation method, after detecting the first common signal, the terminal may further determine the first set based on the first common signal. For example, there may be a plurality of sets sent by the base station to the terminal. For example, a set including 10 common signals, a set including eight common signals, or a set including six common signals. The base station may select one of the sets, and send common signals in the set to the terminal. The set is the first set. After detecting the first common signal, the terminal may determine, based on the first common signal, which set is the first set to which the first common signal belongs in the plurality of sets. For example, the terminal may determine the first set based on a sequence of the synchronization signal of the first common signal. Alternatively, the terminal may determine the first set based on a first channel corresponding to the first common signal. In this application, the first channel may be a broadcast channel, a channel carrying system information, or a control channel. The control channel is used to schedule the channel carrying the system information.

In another implementation method, the first set sent by the base station to the terminal may be alternatively predefined by a protocol. In other words, the first set sent by the base station to the terminal is learned by the terminal in advance. Therefore, the terminal may not perform the foregoing operation of determining the first set in some instances.

805: The terminal determines a resource of the first common signal based on the first index and the second index or based on the second index.

In an implementation method, the first index of the first common signal in the first set corresponds to a plurality of resources, and the second index may indicate one of the plurality of resources. Therefore, the terminal can determine the resource of the first common signal based on the first index and the second index. FIG. 7 is used as an example. The first common signal may be any one of the common signal 0 to the common signal 7 that are sent. After detecting the first common signal, the terminal may determine the first index of the first common signal in the first set, to indicate which common signal in the first set is the first common signal, and may further determine the second index of the first common signal. The second index indicates one of the plurality of resources corresponding to the first common signal. For example, it is determined that the first index of the detected first common signal is 3, and the first common signal indicated by the first index is the common signal 3. In this case, the terminal may determine, based on the first index, that the first common signal corresponds to a resource set including the resource 4 and the resource 8. In other words, when sending the common signal 3, the base station allocates the resource 4 or the resource 8 to the common signal 3. Further, the terminal may determine, based on the second index, a resource actually allocated by the base station to the common signal 3. For example, if the second index indicates the resource 4, the terminal determines that a resource of the common signal 3 is the resource 4. In other words, the base station actually allocates the resource 4 to the common signal 3.

In another implementation method, the terminal determines, based on the second index, the resource of the first common signal from the plurality of resources corresponding to the first set. In this solution, the terminal does not use the first index when determining the resource of the first common signal in some instances. In addition, the resource of the first common signal may be any one of a plurality of resources corresponding to the first common signal. The plurality of resources corresponding to the first common signal are alternatively referred to as a plurality of resources corresponding to the first index, or are referred to as a plurality of resources corresponding to the first set. For example, according to the first grouping rule, the common signal 0 to the common signal 7 are grouped into one group. The group corresponds to a resource set including the resource 1 to the resource 8. The base station may allocate any one of the resource 1 to the resource 8 to any one of the eight common signals. Therefore, the base station may send the eight common signals in the first set in any sending sequence. The first common signal detected by the terminal may be any one of the common signal 0 to the common signal 7 that are sent. After detecting the first common signal, the terminal may determine the first index of the first common signal in the first set, to indicate which common signal in the first set is the first common signal, and may further determine the second index of the first common signal. The second index indicates one of the plurality of resources (namely, the resource 1 to the resource 8) corresponding to the first common signal. For example, if the terminal determines that the first index of the detected first common signal is 3, the first common signal indicated by the first index is the common signal 3. The second index indicates a resource in the resource 1 to the resource 8. For example, the second index indicates the resource 1. It may be determined that the base station allocates the resource 1 to the common signal 3.

Based on the foregoing solution, the terminal determines, based on the detected first common signal, the first index of the first common signal in the first set and the second index of the first common signal, and further determines the resource of the first common signal. In the method, one common signal may correspond to one or more resources, and time division multiplexing may be performed between different resources. Therefore, there is a plurality of sending occasions for one common signal. In addition, each common signal corresponds to one transmit beam direction, so that a sending occasion of a common signal corresponding to a transmit beam direction may be flexibly adjusted. When a plurality of common signals in one set are sent, a sending sequence of common signals corresponding to different transmit beam directions may be determined according to a service requirement, to further determine a resource occupied by each common signal. According to the method, a plurality of common signals in one set may be flexibly sent on different beams, so that a possibility that the common signals are detected by the terminal may be improved, and thus a waste of resources is reduced.

In an implementation method, after the foregoing operation 805, the terminal may further determine, based on the first set and the resource of the first common signal, a resource of a common signal other than the first common signal in the first set. For example, the first set includes eight common signals: the common signal 0 to the common signal 7. The first common signal detected by the terminal is the common signal 3. After determining a resource of the common signal 3, the terminal may further determine, based on the first set, the first index of the common signal 3, and the resource of the common signal 3, resources of the common signal 0 to the common signal 2 and resources of the common signal 4 to the common signal 7.

In an implementation method, after the foregoing operation 805, the terminal may further determine a resource of a second common signal based on the first index or the second index, and receive the second common signal based on the resource of the second common signal. For a meaning of the second common signal, refer to the foregoing description. Details are not described again. For example, there is a correspondence between the first index of the first common signal and the resource of the second common signal. Therefore, the resource of the second common signal corresponding to the first index may be determined based on the first index of the first common signal and the correspondence between the first index of the first common signal and the resource of the second common signal. For another example, one of the plurality of resources corresponding to the first common signal may be determined based on the second index, and then the resource of the second common signal corresponding to the resource of the first common signal is determined based on the determined resource of the first common signal.

In an implementation method, after the foregoing operation 805, the terminal may further perform radio resource management (RRM) measurement based on the first common signal, to obtain an RRM measurement result corresponding to the first common signal, where the RRM measurement result is identified by the first index; and the terminal sends the RRM measurement result corresponding to the first common signal to the base station. The RRM measurement result includes but is not limited to at least one of reference signal received power (RSRP), reference signal received quality (RSRQ), a received signal strength indication (RSSI), or a signal to interference plus noise ratio (SINR).

In this embodiment of this application, the first index of the first common signal in the first set may be determined according to any one of the following methods:

Method 1: The first index of the first common signal in the first set is determined based on a sequence of the synchronization signal.

For example, a sequence 1 of the synchronization signal corresponds to the first index, and a sequence 2 of the synchronization signal and a sequence 3 of the synchronization signal respectively correspond to other indexes. The sequence of the synchronization signal herein may be a sequence of a PSS, or may be a sequence of an SSS.

For another example, a sequence combination 1 of the PSS and the SSS corresponds to the first index, and a sequence combination 2 of the PSS and the SSS and a sequence combination 3 of the PSS and the SSS respectively correspond to other indexes.

Method 2: The first index of the first common signal in the first set is determined based on a first channel corresponding to the first common signal.

Optionally, the first index of the first common signal in the first set is determined based on one or more pieces of the following information corresponding to the first channel: information indicating the first index, a scrambling code of the first channel, and a DMRS sequence of the first channel.

The information indicating the first index corresponds to a first field of the first channel. For example, if the first field includes three bits, eight indexes may be indicated. For example, "000" indicates the first index, and other seven pieces of bit information indicate the other indexes.

There is a plurality of scrambling codes for the first channel. For example, a scrambling code 1 corresponds to the first index, and a scrambling code 2, a scrambling code 3, and the like correspond to other indexes. When obtaining the scrambling code 1 of the first channel, the terminal determines the first index.

There is a plurality of DMRS sequences of the first channel. For example, a DMRS sequence 1 corresponds to the first index, and a DMRS sequence 2, a DMRS sequence 3, and the like correspond to other indexes. When obtaining the DMRS sequence 1 of the first channel, the terminal determines the first index.

In this embodiment of this application, the second index of the first common signal may be determined according to any one of the following methods:

Method 1: The second index of the first common signal is determined based on a sequence of the synchronization signal.

For example, a sequence 1 of the synchronization signal corresponds to the second index, and a sequence 2 of the synchronization signal and a sequence 3 of the synchronization signal respectively correspond to other indexes. The sequence of the synchronization signal herein may be a sequence of a PSS, or may be a sequence of an SSS.

For another example, a sequence combination 1 of the PSS and the SSS corresponds to the second index, and a sequence combination 2 of the PSS and the SSS and a sequence combination 3 of the PSS and the SSS respectively correspond to other indexes.

Method 2: The second index of the first common signal is determined based on a first channel corresponding to the first common signal.

Optionally, the second index of the first common signal is determined based on one or more pieces of the following information corresponding to the first channel: information indicating the second index, a scrambling code of the first channel, and a DMRS sequence of the first channel.

The information indicating the second index corresponds to a second field of the first channel. For example, if the second field includes three bits, eight indexes may be indicated. For example, "000" indicates the second index, and other seven pieces of bit information indicate the other indexes.

There is a plurality of scrambling codes for the first channel. For example, a scrambling code 1 corresponds to the second index, and a scrambling code 2, a scrambling code 3, and the like correspond to other indexes. When obtaining the scrambling code 1 of the first channel, the terminal determines the second index.

There is a plurality of DMRS sequences of the first channel. For example, a DMRS sequence 1 corresponds to the second index, and a DMRS sequence 2, a DMRS sequence 3, and the like correspond to other indexes. When obtaining the DMRS sequence 1 of the first channel, the terminal determines the second index.

It should be noted that the foregoing method for determining the first index and the foregoing method for determining the second index may be implemented in combination with each other.

For example, the first index of the first common signal in the first set and the second index of the first common signal may be determined based on the sequence of the synchronization signal. For example, a relationship between the sequence of the synchronization signal and each of the first index and the second index is shown in Table 1.

TABLE 1

| Sequence of the synchronization signal | First index | Second index |
|---|---|---|
| Sequence 1 | 1 | 0 |
| Sequence 2 | 1 | 1 |
| Sequence 3 | 2 | 0 |
| Sequence 4 | 2 | 1 |
| Sequence 5 | 3 | 0 |
| Sequence 6 | 3 | 1 |
| Sequence 7 | 4 | 0 |
| Sequence 8 | 4 | 1 |
| . . . | . . . | . . . |

For example, when the sequence of the synchronization signal is the sequence 3, it is determined that the first index is 2, and the second index is the index 0. When the sequence of the synchronization signal is the sequence 6, it is determined that the first index is 3, and the second index is the index 1.

For another example, the first index of the first common signal in the first set and the second index of the first common signal may be alternatively determined based on the control channel corresponding to the first common signal. For example, a scrambling code of the control channel is used as an example. A relationship between the scrambling code of the control channel and each of the first index and the second index is shown in Table 2.

TABLE 2

| Scrambling code of the control channel | First index | Second index |
|---|---|---|
| Scrambling code 1 | 1 | 0 |
| Scrambling code 2 | 1 | 1 |
| Scrambling code 3 | 2 | 0 |
| Scrambling code 4 | 2 | 1 |
| Scrambling code 5 | 3 | 0 |
| Scrambling code 6 | 3 | 1 |
| Scrambling code 7 | 4 | 0 |
| Scrambling code 8 | 4 | 1 |
| . . . | . . . | . . . |

For example, when the scrambling code of the control channel is the scrambling code 3, it is determined that the first index is 2, and the second index is the index 0. When the scrambling code of the control channel is the scrambling code 6, it is determined that the first index is 3, and the second index is the index 1.

For another example, the first index of the first common signal in the first set is determined based on the sequence of the synchronization signal, and the second index of the first common signal is determined based on a broadcast channel corresponding to the first common signal.

For another example, the first index of the first common signal in the first set is determined based on the broadcast channel corresponding to the first common signal, and the second index of the first common signal is determined based on a control channel corresponding to the first common signal.

In an implementation method, in this embodiment of this application, a grouping rule of common signals is further used when the first index or the second index is determined. For example, the terminal determines the first index or the second index according to a first grouping rule. Optionally, the terminal determines, from a plurality of candidate rules, the first grouping rule corresponding to the first set.

The following provides descriptions with reference to an example.

For example, the first grouping rule determined by the terminal is as follows:

A group 1 includes the common signal 0 and the common signal 4, and corresponds to a resource set 1 including the resource 1 and the resource 5.

A group 2 includes the common signal 1 and the common signal 5, and corresponds to a resource set 2 including the resource 2 and the resource 6.

A group 3 includes the common signal 2 and the common signal 6, and corresponds to a resource set 3 including the resource 3 and the resource 7.

A group 4 includes the common signal 3 and the common signal 7, and corresponds to a resource set 4 including the resource 4 and the resource 8.

In an example, a field of the control channel indicates the first index and the second index. The terminal obtains bit information in the field of the control channel. There are eight common signals in total, so that the terminal first obtains first three bits of information in the field, and determines the first index based on the three bits of information. Then, the terminal determines, according to the first grouping rule corresponding to the first set, that there are two common signals in each group. The terminal further obtains only one bit of information from the field, for example, obtain a fourth bit of information, and may determine the second index based on the one bit of information. For example, if the determined first index is 3 and indicates the common signal 3, and the determined second index is "0" and indicates the resource 4, the terminal may determine that the detected first common signal is the common signal 3 and corresponds to the resource 4. For another example, if the determined first index is 5 and indicates the common signal 5, and the determined second index is "1" and indicates the resource 6, the terminal may determine that the detected first common signal is the common signal 5 and corresponds to the resource 6.

In an implementation method, the terminal may determine, according to any one or more of the following methods, the first grouping rule corresponding to the first set from a plurality of candidate grouping rules:

Method 1: The first grouping rule corresponding to the first set is determined from the plurality of candidate grouping rules based on a sequence of the synchronization signal in the first common signal.

For example, a sequence 1 of the synchronization signal corresponds to the first grouping rule, and a sequence 2 of the synchronization signal, a sequence 3 of the synchronization signal, and the like correspond to other candidate grouping rules. The sequence of the synchronization signal herein may be a sequence of a PSS, or may be a sequence of an SSS.

For another example, a sequence combination 1 of the PSS and the SSS corresponds to the first grouping rule, and a sequence combination 2 of the PSS and the SSS, a sequence combination 3 of the PSS and the SSS, and the like correspond to other candidate grouping rules.

Method 2: The first grouping rule corresponding to the first set is determined from the plurality of candidate grouping rules based on a quantity of common signals in one group corresponding to the first set.

For example, the terminal receives a piece of quantity information from the base station. The quantity information indicates a quantity of common signals in one group corresponding to the first set. In this case, the terminal may determine, according to the quantity information and the predefined rule, the first grouping rule corresponding to the first set.

For example, if the quantity information received by the terminal is 2, that is, each group includes two common signals, the first grouping rule determined by the terminal is as follows:

A group 1 includes the common signal 0 and the common signal 4, and corresponds to a resource set 1 including the resource 1 and the resource 5.

A group 2 includes the common signal 1 and the common signal 5, and corresponds to a resource set 2 including the resource 2 and the resource 6.

A group 3 includes the common signal 2 and the common signal 6, and corresponds to a resource set 3 including the resource 3 and the resource 7.

A group 4 includes the common signal 3 and the common signal 7, and corresponds to a resource set 4 including the resource 4 and the resource 8.

For another example, if the quantity information received by the terminal is 4, that is, each group includes four common signals, the first grouping rule determined by the terminal is as follows:

A group 1 includes the common signal 0 to the common signal 3, and corresponds to a resource set 1 including the resource 1 to the resource 4.

A group 2 includes the common signal 4 to the common signal 7, and corresponds to a resource set 2 including the resource 5 to the resource 8.

Method 3: The first grouping rule corresponding to the first set is determined from the plurality of candidate grouping rules based on TDD configurations.

Each TDD configuration indicates a ratio of an uplink time domain resource to a downlink time domain resource. The time domain resource herein includes at least one of a symbol, a slot, a subframe, or a radio frame. Optionally, the terminal may obtain a current TDD configuration from the detected first common signal.

For example, a TDD configuration 1 corresponds to the first grouping rule, and a TDD configuration 2 and a TDD configuration 3 respectively correspond to other candidate grouping rules. When the terminal determines that the current TDD configuration is the TDD configuration 1, the terminal determines the first grouping rule corresponding to the first set from the plurality of candidate grouping rules.

It may be understood that, to implement functions in the foregoing embodiment, the base station and the terminal include corresponding hardware structures and/or software modules for performing the functions. A person skilled in the art should be easily aware that this application can be implemented by hardware or a combination of hardware and computer software in combination with the units and the method steps in the examples described in embodiments disclosed in this application. Whether a function is performed by hardware or hardware driven by computer software depends on particular application scenarios and design constraints of technical solutions.

Figure 9:
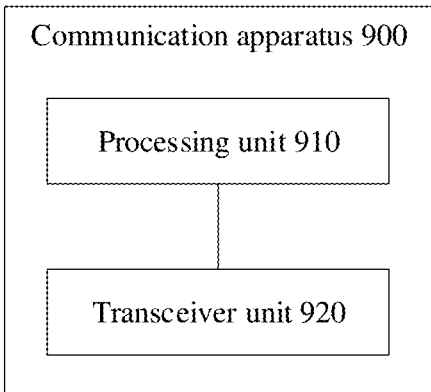
FIG. 9 is a schematic diagram of a structure of a communication apparatus according to an embodiment of this application.
Figure 10:
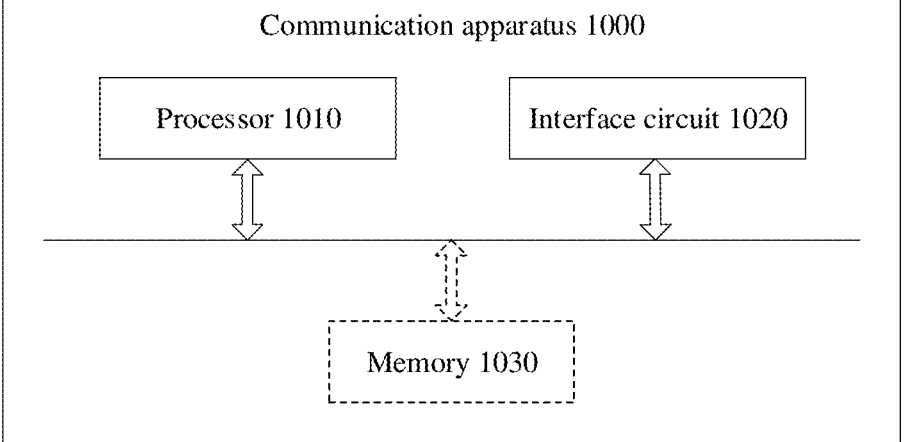
FIG. 10 is a schematic diagram of a structure of a communication apparatus according to an embodiment of this application.

FIG. 9 and FIG. 10 are schematic diagrams of possible structures of communication apparatuses according to embodiments of this application. The communication apparatuses may be configured to implement a function of the terminal or the base station in the foregoing method embodiments. Therefore, beneficial effects of the foregoing method embodiments can also be implemented. In this embodiment of this application, the communication apparatus may be one of the terminals 120*a* to 120*j* shown in FIG. 1, or may be the base station 110*a* or 110*b* shown in FIG. 1, or may be a module (for example, a chip) used in a terminal or a base station.

As shown in FIG. 9, the communication apparatus 900 includes a processing unit 910 and a transceiver unit 920. The communication apparatus 900 is configured to implement the function of the terminal or the base station in the method embodiment shown in FIG. 8.

When the communication apparatus 900 is configured to implement the function of the terminal in the method embodiment shown in FIG. 8: The transceiver unit 920 is configured to receive a common signal from the base station; and the processing unit 910 is configured to detect the common signal, determine a first index of the first common signal in a first set and a second index of the first common signal based on the detected first common signal, where the first set includes a plurality of common signals, the plurality of common signals include the first common signal, the first common signal includes a synchronization signal, the first index corresponds to a plurality of resources, the second index indicates one of the plurality of resources, and the resource includes a time domain resource and/or a frequency domain resource, and determine a resource of the first common signal based on the first index and the second index or based on the second index.

In a possible implementation method, the processing unit 910 is further configured to determine the first index or the second index according to the first grouping rule. The common signals in the first set are grouped into at least one group according to the first grouping rule. Each of the at least one group corresponds to one resource set. The resource set includes at least one of a plurality of resources corresponding to the first index.

In a possible implementation method, the processing unit 910 is further configured to: determine, based on a sequence of the synchronization signal, a first grouping rule corresponding to the first set from a plurality of candidate grouping rules; or determine, based on a quantity of common signals in one group corresponding to the first set, a first grouping rule corresponding to the first set from a plurality of candidate grouping rules; or determine, based on a time division duplexing configuration, a first grouping rule corresponding to the first set from a plurality of candidate grouping rules.

In a possible implementation method, the processing unit 910 is configured to determine the first index based on a sequence of the synchronization signal.

In a possible implementation method, the processing unit 910 is configured to determine the first index based on a first channel corresponding to the first common signal. The first channel is a broadcast channel, a channel carrying system information, or a control channel. The control channel is used to schedule the channel carrying the system information.

In a possible implementation method, the processing unit 910 is configured to determine the first index based on one or more pieces of the following information corresponding to the first channel: information indicating the first index, a scrambling code of the first channel, and a DMRS sequence of the first channel.

In a possible implementation method, the processing unit 910 is configured to determine the second index based on a sequence of the synchronization signal.

In a possible implementation method, the processing unit 910 is configured to determine the second index based on a first channel corresponding to the first common signal. The first channel is a broadcast channel, a channel carrying system information, or a control channel. The control channel is used to schedule the channel carrying the system information.

In a possible implementation method, the processing unit 910 is configured to determine the second index based on one or more pieces of the following information corresponding to the first channel: information indicating the second index, a scrambling code of the first channel, and a DMRS sequence of the first channel.

In a possible implementation method, the processing unit 910 is further configured to determine, based on the resource of the first common signal and the first set, a resource of a common signal other than the first common signal in the first set.

In a possible implementation method, the processing unit 910 is further configured to: determine a resource of a second common signal based on the first index or the second index; and receive, through the transceiver unit 920, the second common signal based on the resource of the second common signal. The second common signal includes a control channel or a channel carrying system information. The control channel is used to schedule the channel carrying the system information.

In a possible implementation method, the processing unit 910 is further configured to perform radio resource management RRM measurement based on the first common signal, to obtain an RRM measurement result corresponding to the first common signal. The RRM measurement result is identified by the first index. The transceiver unit 920 is further configured to send the RRM measurement result corresponding to the first common signal to a radio access network device.

When the communication apparatus 900 is configured to implement the function of the base station in the method embodiment shown in FIG. 8: The processing unit 910 is configured to obtain a first set, where the first set includes a plurality of common signals, the plurality of common signals include a first common signal, the first common signal includes a synchronization signal, an index of the first common signal in the first set is a first index, the first index corresponds to a plurality of resources, a second index of the first common signal indicates one of the plurality of resources, and the resource includes a time domain resource and/or a frequency domain resource; and the transceiver unit 920 is configured to send the common signals in the first set to the terminal.

In a possible implementation method, the first set corresponds to a first grouping rule. The first grouping rule is used to determine the first index or the second index. The common signals in the first set are grouped into at least one group according to the first grouping rule. Each of the at least one group corresponds to one resource set. The resource set includes at least one of the plurality of resources corresponding to the first index.

In a possible implementation method, a sequence of the synchronization signal corresponds to the first grouping rule; or a quantity of common signals in one group corresponding to the first set corresponds to the first grouping rule; or a time division duplexing configuration corresponds to the first grouping rule.

In a possible implementation method, a sequence of the synchronization signal corresponds to the first index.

In a possible implementation method, a first channel corresponding to the first common signal corresponds to the first index. The first channel is a broadcast channel, a channel carrying system information, or a control channel. The control channel is used to schedule the channel carrying the system information.

In a possible implementation method, one or more pieces of the following information corresponding to the first channel correspond to the first index: information indicating the first index, a scrambling code of the first channel, and a DMRS sequence of the first channel.

In a possible implementation method, a sequence of the synchronization signal corresponds to the second index.

In a possible implementation method, a first channel corresponding to the first common signal corresponds to the second index. The first channel is a broadcast channel, a channel carrying system information, or a control channel. The control channel is used to schedule the channel carrying the system information.

In a possible implementation method, one or more pieces of the following information corresponding to the first channel correspond to the second index: information indicating the second index, a scrambling code of the first channel, and a DMRS sequence of the first channel.

In a possible implementation method, the first index or the second index corresponds to a resource of a second common signal. The second common signal includes a control channel or a channel carrying system information. The control channel is used to schedule the channel carrying the system information.

In a possible implementation method, the transceiver unit 920 is further configured to receive a radio resource management RRM measurement result that is from the terminal and that corresponds to the first common signal. The RRM measurement result is identified by the first index.

For more detailed descriptions of the processing unit 910 and the transceiver unit 920, directly refer to related descriptions in the method embodiment shown in FIG. 8. Details are not described herein again.

As shown in FIG. 10, the communication apparatus 1000 includes a processor 1010 and an interface circuit 1020. The processor 1010 and the interface circuit 1020 are coupled to each other. It may be understood that the interface circuit 1020 may be a transceiver or an input/output interface. Optionally, the communication apparatus 1000 may further include a memory 1030, configured to store instructions executed by the processor 1010, or store input data used by the processor 1010 to run instructions, or store data generated after the processor 1010 runs instructions.

When the communication apparatus 1000 is configured to implement the method shown in FIG. 8, the processor 1010 is configured to implement the functions of the processing unit 910, and the interface circuit 1020 is configured to implement the functions of the transceiver unit 920.

When the communication apparatus is a chip used in the terminal, the terminal chip implements the functions of the terminal in the foregoing method embodiment. The terminal chip receives information from another module (for example, a radio frequency module or an antenna) in the terminal, where the information is sent by the base station to the terminal. Alternatively, the terminal chip sends information to another module (for example, a radio frequency module or an antenna) in the terminal, where the information is sent by the terminal to the base station.

When the communication apparatus is a chip used in the base station, the base station chip implements the functions of the base station in the foregoing method embodiment. The base station chip receives information from another module (for example, a radio frequency module or an antenna) in the base station, where the information is sent by the terminal to the base station. Alternatively, the base station chip sends information to another module (for example, a radio frequency module or an antenna) in the base station, where the information is sent by the base station to the terminal.

It may be understood that the processor in embodiments of this application may be a central processing unit (CPU), or may be another general-purpose processor, a digital signal processor (DSP), an application specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented by hardware, or may be implemented by the processor executing software instructions. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or a storage medium in any other form well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in the base station or the terminal. Certainly, the processor and the storage medium may exist in the base station or the terminal as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or instructions are loaded and executed on a computer, all or some of the processes or the functions in embodiments of this application are performed. The computer may be a general-purpose computer, a dedicated computer, a computer network, a base station, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid state disk. The computer-readable storage medium may be a volatile storage medium or a nonvolatile storage medium, or may include both a volatile storage medium and a nonvolatile storage medium.

In embodiments of this application, unless otherwise specified or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects and represents that three relationships may exist. For example, A and/or B may represent the following cases: Only A exists, both A and B exist, and only B exists, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. An apparatus comprising:
at least one processor; and
a non-transitory computer readable medium configured to store a program executable by the at least one processor, the program comprising instructions for:
detecting a common signal;
determining, in response to the detected common signal being a first common signal, a first index of the first common signal in a first set and a second index of the first common signal, wherein the first set comprises a plurality of common signals, the plurality of common signals comprises the first common signal, the first common signal comprises a synchronization signal, the first index corresponds to a plurality of resources, the second index is usable to indicate a resource of the plurality of resources, and the resource comprises a time domain resource or a frequency domain resource;
determining the first index or the second index according to a first grouping rule, wherein the plurality of common signals in the first set are grouped into at least one group according to the first grouping rule, each of the at least one group corresponds to one resource set, and the resource set comprises at least one of the plurality of resources corresponding to the first index; and
determining the resource of the first common signal based on the first index and the second index or based on the second index.

2. The apparatus according to claim 1, wherein each of the plurality of common signals in the first set is capable of being sent at any of a plurality of sending moments corresponding to the first set.

3. The apparatus according to claim 2, further comprising:

determining, based on a sequence of the synchronization signal, the first grouping rule corresponding to the first set from a plurality of candidate grouping rules; or determining, based on a quantity of the plurality of common signals in one group corresponding to the first set, the first grouping rule corresponding to the first set from the plurality of candidate grouping rules; or determining, based on a time division duplexing configuration, the first grouping rule corresponding to the first set from the plurality of candidate grouping rules.

4. The apparatus according to claim 1, wherein the determining the first index comprises:

determining the first index based on a sequence of the synchronization signal.

5. The apparatus according to claim 1, wherein the determining the first index comprises:

determining the first index based on a first channel corresponding to the first common signal, wherein the first channel is:

a broadcast channel, a channel carrying system information, or a control channel, and the control channel is usable to schedule the channel carrying the system information.

6. The apparatus according to claim 5, wherein the determining the first index comprises:

determining the first index based on one or more pieces of information corresponding to the first channel, wherein the information comprises:

information indicating the first index, a scrambling code of the first channel, or a demodulation reference signal (DMRS) sequence of the first channel.

7. The apparatus according to claim 1, wherein the determining the second index comprises:

determining the second index based on a sequence of the synchronization signal.

8. A wireless communication method, comprising:

obtaining a first set, wherein the first set comprises a plurality of common signals, the plurality of common signals comprises a first common signal, the first common signal comprises a synchronization signal, an index of the first common signal in the first set is a first index, the first index corresponds to a plurality of resources, a second index of the first common signal indicates a resource of the plurality of resources, and the resource comprises a time domain resource or a frequency domain resource, wherein the first set corresponds to a first grouping rule, and the first grouping rule is usable to determine the first index or the second index; and the plurality of common signals in the first set are grouped into at least one group according to the first grouping rule, each of the at least one group corresponds to one resource set, and the resource set comprises at least one of the plurality of resources corresponding to the first index; and sending the plurality of common signals in the first set to a terminal.

9. The method according to claim 8, wherein each of the plurality of common signals in the first set is capable of being sent at any of a plurality of sending moments corresponding to the first set.

10. The method according to claim 9, wherein a sequence of the synchronization signal corresponds to the first grouping rule; or a quantity of the plurality of common signals in one group corresponding to the first set corresponds to the first grouping rule; or a time division duplexing configuration corresponds to the first grouping rule.

11. The method according to claim 8, wherein a sequence of the synchronization signal corresponds to the first index.

12. The method according to claim 8, wherein a first channel corresponding to the first common signal corresponds to the first index, and the first channel is:

a broadcast channel, a channel carrying system information, or a control channel, and the control channel is usable to schedule the channel carrying the system information.

13. The method according to claim 12, wherein one or more pieces of information corresponding to the first channel correspond to the first index, and the information comprises:

information indicating the first index, a scrambling code of the first channel, or a demodulation reference signal (DMRS) sequence of the first channel.

14. The method according to claim 8, wherein a sequence of the synchronization signal corresponds to the second index.

15. An apparatus comprising:

at least one processor; and a non-transitory computer readable medium configured to store a program executable by the at least one processor, the program comprising instructions for:

obtaining a first set, wherein the first set comprises a plurality of common signals, the plurality of common signals comprises a first common signal, the first common signal comprises a synchronization signal, an index of the first common signal in the first set is a first index, the first index corresponds to a plurality of resources, a second index of the first common signal is usable to indicate a resource of the plurality of resources, and the resource comprises a time domain resource or a frequency domain resource, wherein the first set corresponds to a first grouping rule, and the first grouping rule is usable to determine the first index or the second index; and the plurality of common signals in the first set are grouped into at least one group according to the first grouping rule, each of the at least one group corresponds to one resource set, and the resource set comprises at least one of the plurality of resources corresponding to the first index; and sending the plurality of common signals in the first set to a terminal.

16. The apparatus according to claim 15, wherein each of the plurality of common signals in the first set is capable of being sent at any of a plurality of sending moments corresponding to the first set.

17. The apparatus according to claim 16, wherein a sequence of the synchronization signal corresponds to the first grouping rule; or a quantity of the plurality of common signals in one group corresponding to the first set corresponds to the first grouping rule; or a time division duplexing configuration corresponds to the first grouping rule.

18. The apparatus according to claim 15, wherein the sequence of a synchronization signal corresponds to the first index.

19. The apparatus according to claim 15, wherein a first channel corresponding to the first common signal corresponds to the first index, and the first channel is:

a broadcast channel, a channel carrying system information, or a control channel, and the control channel is usable to schedule the channel carrying the system information.

20. The apparatus according to claim 19, wherein one or more pieces of information corresponding to the first channel correspond to the first index, and the information comprises:

information indicating the first index, a scrambling code of the first channel, or a demodulation reference signal (DMRS) sequence of the first channel.

\* \* \* \* \*